Jan. 20, 1970             D. FERBER             3,491,344
ELECTRICAL READOUT OF RECORDS UTILIZING A RECORD MEDIUM
WITH CONDUCTIVE REFERENCE LINES AND
A CONDUCTIVE MARKING LINE
Filed May 15, 1967
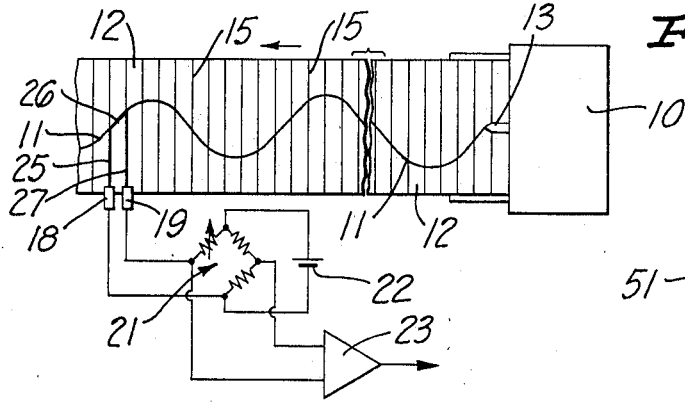
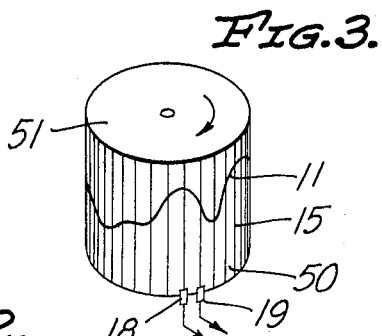
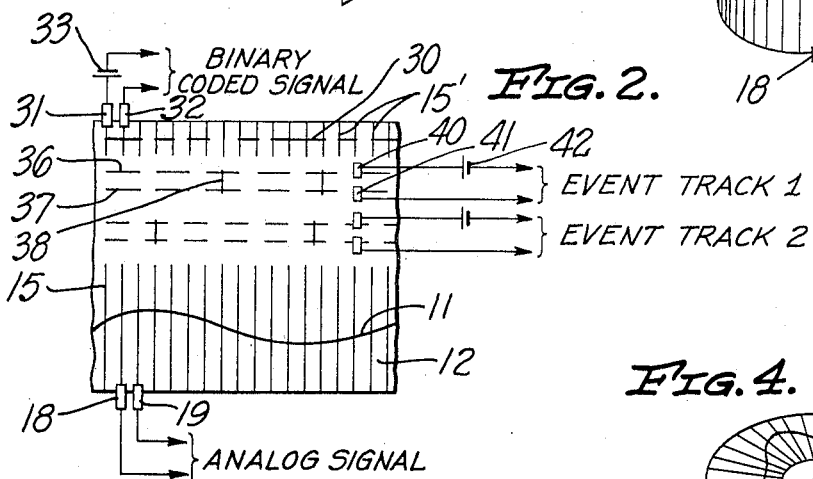
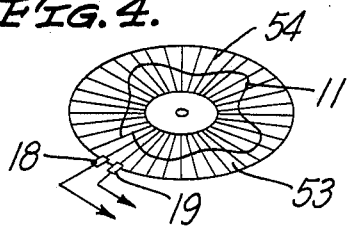
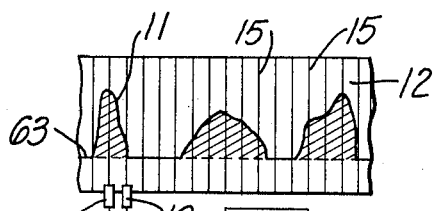
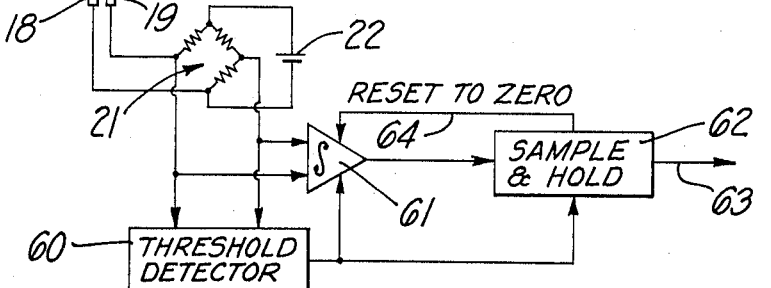
INVENTOR
DAVID FERBER
BY HIS ATTORNEYS
HARRIS, KIECH, RUSSELL & KERN United States Patent Office 3,491,344
Patented Jan. 20, 1970

3,491,344
ELECTRICAL READOUT OF RECORDS UTILIZING A RECORD MEDIUM WITH CONDUCTIVE REFERENCE LINES AND A CONDUCTIVE MARKING LINE
David Ferber, 17139 Bullock St., Encino, Calif. 91316
Filed May 15, 1967, Ser. No. 638,351
Int. Cl. G11b 9/00; G06g 7/18
U.S. Cl. 340—173                                    14 Claims

ABSTRACT OF THE DISCLOSURE

A chart record with conductive reference lines and a conductive marking line. A bridge for developing an electrical output varying as the resistance of a patch comprising portions of a pair of reference lines and the interconnecting marking line. Various reference and marking orientations. An integrating system for reading the areas under curves.

This invention relates to records and record reading and automatic production of electrical signals from a chart or graph or other record. Written records are produced by various means, such as by using an electrical signal to drive a conventional strip chart recorder. At some later time, an electrical signal corresponding to the record is desired for a variety of purposes, such as an input to a machine tool, an input to a computer, display on an oscilloscope or other readout or recording device. It is an object of the present invention to provide a new and improved record reading system which will automatically produce an electrical signal which varies as a function of a written record. More particularly, it is an object of the invention to provide a new and improved method and system including a record formed in a particular manner and an electrical circuit for reading the record.

It is an object of the invention to provide a record reading system including a record surface, a plurality of electrical conductive reference lines on the record surface, an electrical conductive record mark on the surface crossing the reference lines, contact means disposed at the record surface for electrically contacting spaced reference lines, means for moving the record surface past the contact means, and means for developing an electrical signal varying as a function of the resistance of the path between the contact means, with the path comprising portions of the spaced reference lines and of the mark joining such reference lines.

It is an object of the invention to provide such a record reading system that can be utilized with records having various configurations, including but not limited to rectangular, cylindrical and circular.

It is an object of the invention to provide such a record reading system which can be utilized to provide an electrical output which is an analog of the record, an electrical output which is a binary coded signal, and an electrical output coded to indicate occurrence of events. A further object is to provide such a system that can provide an electrical output which is a function of the area under curves on the record.

It is an object of the invention to provide a new and improved method of producing an electrical signal from a record including the steps of writing a record in electrical conductive marking material on a record surface having a pattern of electrical conductive reference lines thereon, generating an electrical signal which varies as a function of the resistance between a pair of spaced reference lines, and generating an electrical signal which varies as a function of the resistance between each succeeding pair of spaced reference lines.

The invention also comprises novel combinations and arrangements of parts, which will more fully appear in the course of the following description. The drawing merely shows and the description merely describes preferred embodiments of the present invention which are given by way of illustration or example.

In the drawing:
FIG. 1 is a diagrammatic illustration of a preferred embodiment of the record reading system of the invention;
FIG. 2 is a diagram similar to FIG. 1 illustrating some alternative embodiments of the invention;
FIGS. 3 and 4 are illustrations similar to FIG. 1 illustrating the use of the invention with a cylindrical record and with a circular record, respectively; and
FIG. 5 is a diagram similar to that of FIG. 1 illustrating another alternative embodiment suitable for providing an output signal which is a function of the area under curves on the record.

Referring to the embodiment of FIG. 1, a strip chart recorder 10 produces a record or mark 11 on a strip of paper or other recording surface 12. An arm 13 is moved back and forth across the paper 12 as the paper is fed from the recorder. A pen or other suitable marking device is carried by the arm 13 to make the record mark 11. The construction and operation of the recorder may be conventional, with the single requirement that the pen or other marking element lay down a mark which is electrically conductive.

The record paper 12 is provided with a plurality of reference lines 15 which are also formed of an electrical conductive material. The particular arrangement of the reference lines 15 will depend upon the type of information being recorded and the type of recorder being utilized. In the embodiment of FIG. 1, the reference lines are disposed parallel to each other and transverse to the direction of travel of the paper through the recorder, and are uniformly spaced.

While the record is illustrated herein as being made by a recorder 10, other ways of making the record can be utilized such as drawing by hand, tracing over an existing chart or graph, and the like.

Electrical contacts 18, 19 are positioned at an edge of the record paper 12 for making an electrical contact with the conductive reference lines 15. Means (not shown) are provided for moving the contacts relative to the record paper. When a continuous strip of record paper is being analyzed, the strip may be moved past the contacts. Alternatively, when the records are in discrete pieces of uniform size, the mechanism might provide for moving the contacts along the record paper.

A resistance bridge circuit 21 is utilized to provide an electrical output signal which varies as a function of the electrical resistance between the contacts 18, 19 with this resistance forming one arm of the bridge. A voltage source in the form of a battery 22 is connected across two opposing corners of the bridge, with the bridge output appearing at the other two opposing corners and serving as an input to an amplifier 23. The resistance between the contacts 18, 19 consists of a conductive path on the chart 12 comprising a portion 25 of a reference line, a portion 26 of the mark 11, and a portion 27 of the adjacent reference line (this path is indicated by the heavier lines on FIG. 1). It is readily seen that the resistance of this path will vary as a function of the distance of the portion 26 of the mark from an edge or from any other base line of the record. Hence the electrical output from the bridge will be an analog of the recorded information. It is preferred to have the conductivity of the ink or other marking material which forms the mark 11 high in comparison with the conductivity of the material utilized to form the reference lines 15, so that the length of the portion 26 of the path will have a negligible effect on the output.

A binary coding of information, such as time, date, and the like, may be produced on the record paper 12 at the time the mark 11 is produced or at some independent time. This binary coded information may be read from the record at the time the analog of the mark 11 is read or at some other time. One arrangement for performing this operation is illustrated in FIG. 2, where elements corresponding to those of FIG. 1 are identified by the same reference numerals. Reference lines 15' are provided on the record surface 12. These reference lines may be continuations of the reference lines 15 with an electrical gap therebetween or may take any other suitable form. Information is recorded by means of a conductive mark 30 which selectively connects adjacent reference lines 15'. The information is read by means of electrical contacts 31, 32, similar to the contacts 18, 19. Since this information is in binary form, a simple on-off circuit can be utilized with a battery 33 connected in series with one of the contacts so that there will be an output signal providing a voltage when there is a mark 30 connecting the reference lines 15' being contacted by the contacts 31, 32, and no voltage when there is no mark.

The occurrence of events may also be recorded and read out and two event tracks are illustrated on the chart of FIG. 2. Event track 1 includes segmented conductive lines 36, 37 which are formed on the record paper 12, the lines being segmented to provide pairs which may be connected by a conductive mark 38 applied by a conventional marking pen or the like. Contacts 40, 41 are positioned for engaging the respective lines 36, 37 and a battery voltage source 42 is connected to one of the contacts. With this arrangement, there is an output voltage for event track 1 when the contacts 40, 41 are engaging a pair of segments which are connected by a conductive mark. The length of the segment pairs is chosen based upon the desired time resolution for the particular system being operated.

As indicated above, the particular physical configuration of the record is not critical. FIG. 3 illustrates a record paper 50 positioned about a cylinder 51, with the conductive reference lines 15 disposed parallel to the axis of the cylinder and with the conductive mark or record 11 thereon.

The arrangement of FIG. 3 may be utilized in generating an analog signal of a record in the same manner as the arrangement of FIG. 1. The FIG. 3 arrangement also provides for cyclically repeating such a signal and can be utilized to generate a periodic signal having any desired characteristic. For example, the desired function may be drawn on the record surface 50 manually or with an appropriate drawing device, after which the cylinder is rotated at a desired speed to cyclically generate the electrical signal analog of the function.

Another alternative arrangement is illustrated in FIG. 4 wherein the record paper is in the form of a circular chart 53, with conductive reference lines 54 thereon in the form of radii. The conductive mark 11 is made in any suitable manner. This configuration can be utilized to produce the cyclical or periodic outputs in the same manner as the configuration of FIG. 3.

FIG. 5 illustrates another form of the record reading system of the invention particularly adapted for determining the areas under curves. The output of the bridge circuit 21 is connected to a threshold detector unit 60 and to an integrator 61. The output of the integrator is connected to a sample and hold circuit 62.

The threshold detector 60 operates to enable or turn on the integrator 61 when the mark 11 departs from the base line level 63 and to disable or turn off the integrator when the mark 11 returns to the base line level. Also, the threshold detector provides a signal to the sample and hold circuit 62 when the mark returns to the base line level causing the circuit 62 to sample the output of the integrator 61 at that time and to retain this value for transmission of an output line 63. After the unit 62 has sampled the integrator output, the unit generates a reset signal on line 64 for resetting the integrator to zero making the circuit ready for reading the next curve area. The circuit details of the detector 60, integrator 61 and circuits 62 may be conventional and can be varied to suit the desires of the circuit designer.

Although exemplary embodiments of the invention have been disclosed and discussed, it will be understood that other applications of the invention are possible and that the embodiments disclosed my be subjected to various changes, modifications and substitutions without necessarily departing from the spirit of the invention.

I claim:

1. In a record reading system for producing an electrical signal varying as a function of a record, the combination of:
    a record surface;
    a plurality of electrical conductive reference lines of substantially uniform resistance on said record surface defining a plurality of successive zones;
    an electrical conductive record mark on said surface crossing said reference lines;
    first and second contact means disposed at said record surface for electrically contacting spaced reference lines;
    means for moving said record surface past said contact means; and
    means for developing an electrical signal varying as a function of the resistance of the path between said first and second contact means, said path comprising portions of spaced reference lines and the portion of said mark joining such reference lines.

2. A system as defined in claim 1 in which said means for developing includes a bridge circuit and means for electrically connecting said path in one arm of the bridge.

3. A system as defined in claim 1 in which said record surface is rectangular, with said reference lines disposed thereon in parallel transverse arrangement.

4. A record system as defined in claim 1 in which said record surface is cylindrical, with said reference lines disposed thereon parallel to the axis of said cylinder.

5. A system as defined in claim 1 in which said record surface is in the form of a disc, with said reference lines disposed thereon in the form of radii.

6. A system as defined in claim 1 including:
    a plurality of second electrical conductive reference lines on said record surface;
    a second electrical conductive record mark on said surface crossing at least some of said second reference lines;
    third and fourth contact means disposed at said record surface for electrically contacting spaced second reference lines; and
    means for developing a second electrical signal when said second mark connects second reference lines being contacted by said third and fourth contact means.

7. A system as defined in claim 1 including:
    a pair of interrupted second electrical conductive reference lines on said record surface disposed generally transverse to said first reference lines and defining pairs of second reference line segments;
    third and fourth contact means disposed at said record surface for electrically contacting corresponding segments of said second reference lines; and
    means for developing a second electrical signal when a conductive mark connects both segments of a pair.

8. A system as defined in claim 6 including:
    a pair of interrupted third electrical conductive reference lines on said record surface disposed generally transverse to said first reference lines and defining pairs of third reference line segments;

fifth and sixth contact means disposed at said record surface for electrically contacting corresponding segments of said third reference lines; and means for developing a third electrical signal when a conductive mark connects both segments of a pair.

9. In a record reading system for producing an electrical signal varying as a function of a record, the combination of:

a record surface;

a plurality of electrical conductive reference lines on said record surface;

an electrical conductive record mark on said surface crossing at least some of said reference lines selectively interconnecting said reference lines;

a pair of contact means disposed at said record surface for electrically contacting spaced reference lines; and means for developing an electrical signal when said mark connects reference lines being contacted by said contact means.

10. A system as defined in claim 9 including a pair of interrupted additional electrical conductive reference lines on said record surface disposed generally transverse to the first reference lines and defining pairs of additional reference line segments;

another pair of contact means disposed at said record surface for electrically contacting corresponding segments of said additional reference lines; and means for developing another electrical signal when a conductive mark connects both segments of a pair.

11. In a record reading system for producing an electrical signal varying as a function of a record, the combination of:

a record surface;

a pair of interrupted electrical conductive reference lines on said record surface disposed generally parallel to each other and defining pairs of reference line segments;

a pair of contact means disposed at said record surface for electrically contacting corresponding segments of said reference lines;

an electrical conductive mark on said surface connecting at least some of said pairs of segments; and means for developing an electrical signal when a conductive mark connects both segments of a pair.

12. A system as defined in claim 1 including:

integrating means having said electrical signal as an input and providing an output which is the integral of the input;

threshold detector means having said electrical signal as an input and providing a control signal when said electrical signal corresponds to a predetermined value for turning said integrating means on and off; and means for resetting said integrating means output to zero.

13. A system as defined in claim 12 in which said means for resetting includes means for measuring the integrating means output prior to resetting.

14. A method of producing an electrical signal from a record, including the steps of:

writing a record in electrical conductive marking material on a record surface having a pattern of electrical conductive reference lines of substantially uniform resistance;

generating an electrical signal which varies as a function of the resistance between a pair of spaced reference lines; and generating an electrical signal which varies as a function of the resistance between a succeeding pair of spaced reference lines.

References Cited

UNITED STATES PATENTS

| | | | |
|---|---|---|---|
| 1,396,178 | 11/1921 | Foley. | |
| 2,614,327 | 10/1952 | Russell. | |
| 3,147,461 | 9/1964 | Mondschein | 340—73 |
| 3,230,358 | 1/1966 | Davis | 235—183 |
| 3,296,613 | 1/1967 | Andersen | 235—183 |
| 3,307,019 | 2/1967 | Woodard | 235—183 |
| 3,355,741 | 11/1967 | Rabin. | |
| 3,360,636 | 12/1967 | Ramsay | 235—183 X |

TERRELL W. FEAR, Primary Examiner

H. L. BERNSTEIN, Assistant Examiner

U.S. Cl. X.R.

179—100.1; 235—183; 338—13; 346—74, 135